Aug. 26, 1969           D. A. PADDOCK ET AL           3,463,006
                          THERMAL FLUX GAUGE
                        Filed Sept. 29, 1966

INVENTOR.
David A. Paddock
Robert G. Hardy

Wayne Lang
AGENT

United States Patent Office 3,463,006
Patented Aug. 26, 1969

3,463,006
THERMAL FLUX GAUGE
David A. Paddock and Robert G. Hardy, Wellsville, N.Y., assignors to The Air Preheater Company, Inc., Wellsville, N.Y., a corporation of Delaware
Filed Sept. 29, 1966, Ser. No. 583,043
Int. Cl. G01f 3/08
U.S. Cl. 73—355                                    2 Claims

ABSTRACT OF THE DISCLOSURE

A portable electronic gauge for measuring by radiation the temperature of a distant source of heat. The gauge has shutter means behind its entrance aperture, to protect the radiation sensing means from ambient conditions and control the exposure thereof.

---

The present invention relates to a device for gauging the output of thermal flux emanating from a predetermined source. More particularly the invention relates to a device and technique for quickly and accurately detecting the output of thermal flux as radiated by a rocket exhaust plume or any other hard-to-measure source. The invention described herein was made in the performance of work under a NASA contract and is subject to the provisions of Section 305 of the National Aeronautics and Space Act of 1958, Public Law 85–568 (72 Stat. 435; 42 U.S.C. 2457).

In the device of this invention a voltage is produced as a function of the thermal flux reaching the detecting means. The voltage so produced is impressed on a potentiometer or the like where it may be measured in terms of potential difference. If the potentiometer is calibrated in proper terms, its reading may be made directly in terms of heat flow quantity.

The results obtained are thus an indication of radiative thermal flux reaching the device and may be gained either singly or repeatedly. If gained repeatedly the results are an indication of the trend over a longer period of time and may therefore be used for continuous or long term testing.

The thermal flux gauge of the present invention is simple and easy to construct, extremely light but rugged, and is sensitive, accurate and more adaptable to either short or long term testing than any other known device previously developed.

The manner in which these and other improvements are attained will become more apparent when read in conjunction with the following description and drawings in which.

Figure 1:
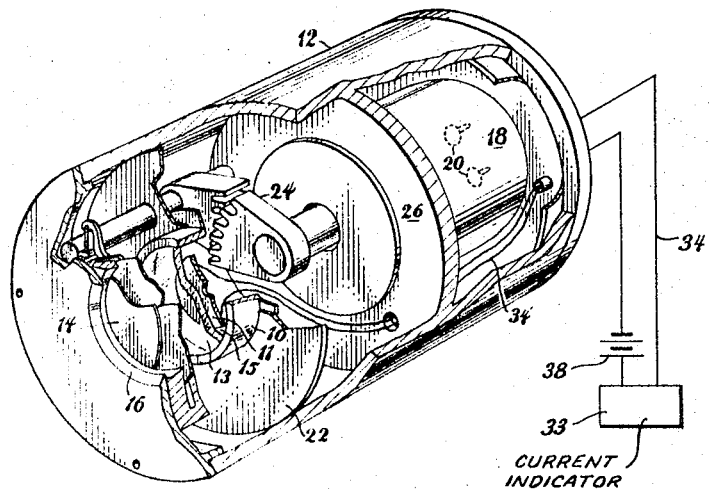
FIGURE 1 is a partially broken away perspective view of the invention.
Figure 2:
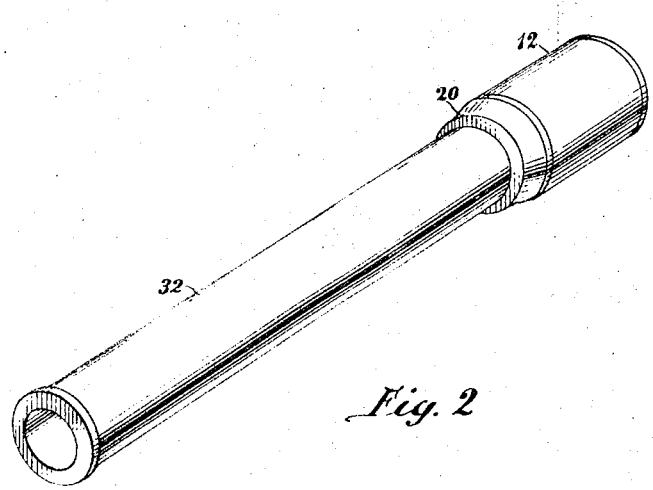
FIGURE 2 is a perspective view of the device including an extension tube which limits its field of use.

Generally the advantages of this invention are to be attained by exposing the flux detector assembly 10 to a source of thermal radiative flux for but a short duration of time. To effect such a short term of exposure requires that an opaque housing 12 have a normally closed shutter means 14 at one end thereof adjacent a centrally positioned aperture or window 16. The shutter is shown as actuated by a rotary solenoid 18 in response to a remotely controlled stimulus such as may be controlled by a switching means (not shown). The shutter may be operated either singly or on an intermittent basis in the manner defined to obtain the type of exposure required for long or short term testing.

The flux detector 10 is mounted in an opening in partition means 22 which extends across the housing 12 intermediate the shutter 14 and the rotary solenoid 18. A transmission means 24 for moving the shutter in response to actuation of the rotary solenoid 18 is provided intermediate the solenoid and shutter and at one side of the detector 10.

The rotary solenoid 18 is held in place in housing 12 by a retainer 26 or the like, and terminals 20 are provided to electrically actuate the solenoid from an outside location. When the solenoid is energized the shutter 14 is thus actuated by the connecting gear train 24 or other transmission means provided.

The detector 10 is set in partition 22 closely adjacent the opening 16 whereby it may receive substantially all the radiation transmitted therethrough. The sides of the opening 16 may be tapered as shown in FIGURE 1 or the end of the housing 12 may be suitably formed to receive an adapter 20 which will accommodate any one of various extensions 32 that in turn vary the viewing angle of the flux detector. Thus a long tube 32 of small diameter might be used to receive the flux emanating from a single small source while a short tube or no tube at all might be used to receive the radiative flux from a broad source of supply or where a general indication was desired.

The flux detector 10 includes essentially a sensor 11 and an infrared transmitting windowpane 13 which protects the sensor from the effects of thermal convection. An evacuated or dead air space 15 is also provided intermediate the windowpane 13 and the sensor 11 to reduce thermal conduction to the sensor from an outside source. The sensor 11 comprises a narrow strip of platinum film applied to the surface of a small glass wafer. Inasmuch as the resistivity of such a platinum strip is approximately 0.14 percent change of resistance per degree Fahrenheit temperature change, the resistance of sensor 11 will vary significantly with its change of temperature.

The electrical signal produced by the change in film resistance of the sensor 11 is brought out to current indicating means 33 by a pair of insulated lead wires 34 which are likewise used to conduct a reference voltage to the sensor from a source 38. A reference voltage is required because the sensor is a passive device which requires an external source of electrical energy for excitation.

In operation the device of this invention is mounted at a known distance from a given heat source with the viewing aperture thereof pointed toward said source of heat. Electrical connections are made to both the rotary solenoid 18 and to the sensor 11 to operate the rotary solenoid as desired, to provide the necessary reference voltage to the sensor, and to transmit its output signal to a predetermined location for detection and measurement as may be required. The same means of transmission used to place a reference voltage on the sensor may also be used to transmit an output signal therefrom.

A reference voltage is placed on the sensor 11 and the solenoid 18 is actuated either singly or intermittently at the speed desired to open and close the shutter mechanism 14. The reference voltage is essentially a constant voltage applied across the sensor, a passive sensing device. When heat is applied to the thin film sensor, a change in resistance of the platinum strip occurs and an incremental change in current results. It is this difference in current that is transmitted through conductors 34 as an indication of the heat rate being measured. The reference voltage which is impressed across the sensor and the signal current developed in the sensor and conducted therefrom are transmitted on the same two conductors into and out of the sensor 11. As the blades of the shutter open and close they admit to the sensor 11 a short duration pulse of thermal energy. The voltage impressed across the sensor undergoes a change with respect to the thermal energy radiated thereto and is read, after proper amplification, on a galvanometer, an oscilliscope or other indicating device (not shown).

The shutter 14 is actuated by the rotary solenoid 18 and gear transmission means 24 to permit a short pulse of radiactive energy to traverse the opening in the shutter and strike the sensor 11 of the detector 10. However, between periods of such actuation the shutter remains closed to thus permit the sensor to return to a period of normalcy wherein the only electrical potential difference across said sensor is the voltage impressed thereon by the reference voltage traversing conductors 34.

The sensor returns to normalcy immediately upon closure of the shutter and termination of the passage of radiative flux thereto. If opened but once the shutter will permit a single pulse of energy to strike the sensor and accordingly vary its output voltage in an amount proportionate to the thermal flux being radiated thereto. If the motor is operated continuously and the shutter is opened and closed intermittently a series of individual energy pulses will strike the sensor and the output of voltage therefrom will vary intermittently in accordance with the intensity of the separate energy pulses transmitted thereto.

The shutter 14 also protects the interior of the device from the effects of extraneous dust and dirt while the heat transmitting windowpane 13 and the space 15 adjacent thereto effectively isolate the sensor 11 from other than heat or thermal energy that is transmitted thereto by radiation.

The gauge being substantially a self-contained mechanism requires only a source of basic electrical power and any of various read-out equipment to be entirely effective in the manner defined.

Thus may the solenoid, the gear transmission means, the shutter means or any of other parts of the invention be varied considerably from what is shown without departing from the spirit of the invention. It is therefore intended that all other matter contained in the above description or shown in the accompanying drawings shall be interpreted as illustrative and not in a limiting sense.

We claim:
1. Apparatus for the detection of thermal flux comprising a house having an aperture in a wall at one end thereof and a partition extending across said housing in spaced relation thereto dividing said housing into a chamber adjacent and a chamber remote from said aperture, a thermal flux sensitive sensor in said housing intermediate the aperture in said wall and said partition positioned to detect thermal flux traversing said aperture, shutter means for said aperture biased to a closed position and adapted to open momentarily to expose said sensor to a source of thermal flux, means in the chamber remote from said aperture adapted to actuate said shutter and expose the sensor to the thermal flux radiated by said source, a source of electrical energy for placing a constant reference voltage on said sensor, and means for indicating the total current traversing said sensor whereby the current variation from reference indicates the thermal flux at the source.

2. Apparatus as defined in claim 1 including means for varying the field of view of said sensor comprising an elongated tubular member fixed to said housing in advance of the shielding means.

References Cited
UNITED STATES PATENTS

| | | | |
|---|---|---|---|
| 890,895 | 6/1908 | Féry | 73—355 |
| 1,667,355 | 4/1928 | Norton | 73—355 XR |
| 3,034,355 | 5/1962 | Butler | 73—355 |
| 3,187,574 | 6/1965 | Mason et al. | 73—355 |
| 3,222,930 | 12/1965 | Smith | 73—355 |
| 3,254,222 | 5/1966 | Hudson | 73—355 XR |
| 3,264,931 | 8/1966 | Ackerman et al. | 73—355 XR |
| 3,354,773 | 11/1967 | Shreve | 73—355 XR |
| 1,639,534 | 8/1927 | Ruben | 73—355 XR |

LOUIS R. PRINCE, Primary Examiner

FREDERICK SHOON, Assistant Examiner